United States Patent
Rajanna et al.

(10) Patent No.: US 10,042,746 B2
(45) Date of Patent: Aug. 7, 2018

(54) CALLPATH FINDER

(71) Applicant: GOOGLE INC., Mountain View, CA (US)

(72) Inventors: Ramakrishna Rajanna, Bangalore (IN); Deepank Gupta, Sunnyvale, CA (US); Arul Siva Murugan Velayutham, Villivakkam (IN); Abhishek Sheopory, New Delhi (IN); Ankit Agarwal, Bengaluru (IN)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 14/963,841

(22) Filed: Dec. 9, 2015

(65) Prior Publication Data

US 2016/0092350 A1 Mar. 31, 2016

Related U.S. Application Data

(62) Division of application No. 14/084,399, filed on Nov. 19, 2013, now Pat. No. 9,218,169.

(51) Int. Cl.
*G06F 9/44* (2018.01)
*G06F 11/36* (2006.01)
(Continued)

(52) U.S. Cl.
CPC ............ *G06F 11/3688* (2013.01); *G06F 8/43* (2013.01); *G06F 8/70* (2013.01); *G06F 8/74* (2013.01); *G06F 8/75* (2013.01); *G06F 11/3676* (2013.01)

(58) Field of Classification Search
CPC .......... G06F 11/3688; G06F 8/43; G06F 8/70; G06F 11/3676
See application file for complete search history.

(56) References Cited

U.S. PATENT DOCUMENTS 7,120,904 B1 10/2006 Robison
7,174,536 B1 2/2007 Kothari et al.
(Continued)

FOREIGN PATENT DOCUMENTS

CN 103345472 * 6/2013
CN 103336760 A 10/2013
(Continued)

OTHER PUBLICATIONS

Office Action dated May 9, 2017 in Japanese Patent Application No. 2016-532101 and English translation thereof.
(Continued)

*Primary Examiner* — Camquy Truong
(74) *Attorney, Agent, or Firm* — McDermott Will & Emery LLP

(57) ABSTRACT

Techniques and systems for creating a function call graph for a codebase are disclosed. Graph creation includes identifying functions in the codebase by a function signature and representing a function as a first node in the call graph. For that function, identifying call-to functions, call-from functions, and inheritance parents and children, and a base class from the function signature of that function; adding child nodes to the first node based on the identified call-to and call-from functions; for an interface call to a base class method in the function, adding child nodes to the first node based on implementations of an override of the base class method; for an added child node, removing that child node from the first node if a source file that includes an implementation of an override and a source code file that includes the function don't share at least one common binary file.

19 Claims, 7 Drawing Sheets

(51) Int. Cl.
  *G06F 8/41* (2018.01)
  *G06F 8/70* (2018.01)
  *G06F 8/74* (2018.01)
  *G06F 8/75* (2018.01)

(56) References Cited

U.S. PATENT DOCUMENTS

| | | |
|---|---|---|
| 7,757,219 B2 | 7/2010 | Ball et al. |
| 8,347,272 B2 | 1/2013 | Sugawara et al. |
| 8,762,396 B2 | 6/2014 | Hudzia et al. |
| 2003/0018603 A1 | 1/2003 | Tip et al. |
| 2006/0236309 A1 | 10/2006 | George |
| 2007/0150878 A1* | 6/2007 | Cates .................. G06F 8/75 717/151 |
| 2007/0234305 A1 | 10/2007 | Mishra et al. |
| 2008/0301502 A1 | 12/2008 | Harsha et al. |
| 2009/0132474 A1 | 5/2009 | Ma et al. |
| 2009/0293049 A1 | 11/2009 | Gorelkina |
| 2010/0023926 A1 | 1/2010 | Sugawara et al. |
| 2010/0083236 A1 | 4/2010 | Porto et al. |
| 2011/0145800 A1 | 6/2011 | Rao et al. |
| 2012/0011150 A1 | 1/2012 | Swaminathan et al. |
| 2012/0287934 A1 | 11/2012 | Sarela et al. |
| 2012/0300781 A1 | 11/2012 | Sarela et al. |
| 2013/0124757 A1 | 5/2013 | Norrman et al. |
| 2013/0132408 A1 | 5/2013 | Little et al. |
| 2013/0132780 A1 | 5/2013 | Bohnet et al. |
| 2013/0166576 A1 | 6/2013 | Hudzia et al. |
| 2013/0174127 A1 | 7/2013 | Chen et al. |
| 2013/0198237 A1 | 8/2013 | Serban et al. |
| 2013/0290936 A1 | 10/2013 | Rhee et al. |
| 2014/0165038 A1 | 6/2014 | Kaler et al. |
| 2014/0173488 A1 | 6/2014 | Munkes et al. |

FOREIGN PATENT DOCUMENTS

| | | |
|---|---|---|
| CN | 103345472 A | 10/2013 |
| EP | 2390790 A1 | 11/2011 |
| JP | H11-095990 A | 4/1994 |
| JP | 2001-092652 A | 4/2001 |
| JP | 2011-248895 A | 12/2011 |
| WO | 2013005825 A1 | 2/2015 |

OTHER PUBLICATIONS

Anonymous: "Bloom Filter" Wikipedia, 14 pages, Oct. 28, 2013. Retrieved from URL: https://en.wikipedia.org/w/index.php?title=Bloom_filter&oldid=579088961.

Extended European Search Report dated Jul. 11, 2017 in European Patent Application No. 14864350.5 (9 pages).

Office Action dated Jun. 21, 2017 in Korean Patent Application No. 10-2016-7012999 and English translation thereof.

International Search Report and Written Opinion dated Feb. 27, 2015 in PCT Application No. PCT/US2014/065906.

International Preliminary Report on Patentability dated May 7, 2015 in PCT Application No. PCT/US2014/065906.

Office Action dated Feb. 27, 2015 in U.S. Appl. No. 14/084,399.

Office Action dated Jun. 18, 2015 in U.S. Appl. No. 14/084,399.

Notice of Allowance dated Aug. 14, 2015 in U.S. Appl. No. 14/084,399.

Notice of Allowance dated Dec. 19, 2017 in Korean Patent Application No. 10-2016-7012999 and English translation thereof.

Final Office Action dated Dec. 12, 2017 in Japanese Patent Application No. 2016-532101 and English translation thereof.

* cited by examiner

| Graph Node 2010 | | |
|---|---|---|
| Function Signature 20200 | | |
| Bloom Filter 20210 | | |
| Function Absolute Path 20190 | | |
| Node Child 1 20100 | Child 1 Kind 20110 | Child 1 RPC 20120 |
| Node Child 2 20130 | Child 2 Kind 20140 | Child 2 RPC 20150 |
| ⋮ | ⋮ | ⋮ |
| Node Child n 20160 | Child n Kind 20170 | Child n RPC 20180 |

Fig. 2

CALLPATH FINDER

This application is a Divisional of copending application Ser. No. 14/084,399, filed on Nov. 19, 2013, all of which are hereby expressly incorporated by reference into the present application.

BACKGROUND

Increasingly, a complex large-scale software product or software development environment may require that programmers doing development or maintenance read unfamiliar code. In such situations, it may be challenging and time-consuming to trace the control flow from one function to another.

SUMMARY

In some embodiments of solutions discussed herein pertain to a method of generating a function call graph for a codebase, the method comprising: identifying functions in the codebase by a function signature; representing a particular identified function as a first node in the function call graph; for the particular function, identifying call-to functions, call-from functions, inheritance parents, and inheritance children, and a base class associated with the particular function based on the function signature of that particular function; adding first child nodes to the first node based on the identified call-to and call-from functions; for an interface call to a base class method in the particular function, adding second child nodes to the first node based on implementations of an override of the base class method; for at least one added second child node, determining whether a first source code file that includes a particular added implementation of an override and a second source code file that includes the particular function share at least one common binary file; and in response to a determination that the first and second source code files do not share a common binary file, removing the added second child node from the first node.

In some embodiments, the method includes identifying graph edges between the first node and the added second child nodes for subsequent ranking. In some embodiments the method includes reducing a memory footprint of the function call graph.

In some embodiments, reducing a memory footprint includes applying a hash function to each function signature and storing a result of the hash function as a representation of the function signature.

In some embodiments, determining whether a first source code file that includes a particular added implementation of an override and a second source code file that includes the particular function share at least one common binary file includes: identifying dependencies associated with the particular function; generating a first Bloom filter to test binary files for the identified dependencies, generating a Bloom filter including varying a size of the first generated Bloom filter based on a number of identified dependencies; and applying the first generated Bloom filter to a particular binary file in order to determine whether the particular binary file includes the particular function.

In some embodiments, determining whether a first source code file that includes a particular added implementation of an override and a second source code file that includes the particular function share at least one common binary file further includes: applying a second generated Bloom filter to the particular binary file in order to determine whether the particular binary file includes the particular added implementation; and determining that the first and second source code files share the particular binary file as a common binary file in response to the particular binary file passing both the first and second generated Bloom filters.

In some embodiments, the method further includes generating a Bloom filter based on binary files of the codebase that are compiled or generated using the second source code file; and adding the generated Bloom filter to the first node.

In some embodiments, determining whether a first source code file that includes a particular added implementation of an override and a second source code file that includes the particular function share at least one common binary file includes: applying the Bloom filter of the first node to the first source code file.

In some embodiments, the size of the Bloom filter is determined by how many binary files of the codebase are compiled or generated using the second source code file, such that a frequently-used source code file is associated with a larger size Bloom filter.

In some embodiments of solutions discussed herein pertain to a method of determining a likely call path between two functions in a code base, the method comprising: receiving, as inputs, a source function and a destination function; identifying, in a function call graph, a starting node associated with the source function and an ending node associated with the destination function; searching possible paths in the function call graph between the starting node and the ending node, said searching including, for each node along a search path, evaluating the node against a list of common dependencies shared by the starting node and the ending node; for an evaluated node having a dependency included in the list of common dependencies, including the evaluated node in a possible path and searching all possible paths in the function call graph between any child nodes of the evaluated node and the starting node or the ending node; for an evaluated node not having a dependency included in the list of common dependencies, excluding the evaluated node from any possible path; sorting all possible paths between the starting node and the ending node generated as a result of said searching ad evaluating steps; and returning, as a likely call path, at least one of the sorted possible paths.

In some embodiments, sorting all possible paths includes: ordering said all possible paths from shortest to longest; identifying, from among the ordered paths, those paths entirely within a single codebase; applying weight factors to the ordered paths such that said all possible paths are ordered from most likely to least likely based on path length and weight factor, the weight factor including indicating as more likely those paths entirely within a single codebase; and returning, as a likely call path, at least the most likely path after said applying weight factors.

In some embodiments, applying weight factors includes generating weight factors based on historical trace data generated from previous function executions such that function call paths indicated by the historical trace data are associated with weight factors indicating those paths as more likely.

In some embodiments, applying weight factors includes applying class-based weight factors such that call paths including commonly used object classes will be indicated as more likely.

In some embodiments, searching possible paths includes searching all possible paths. In some embodiments, searching possible paths includes performing a bi-directional search originating from both the starting and ending nodes.

In some embodiments of solutions discussed herein pertain to a data structure representing a function call graph for a codebase, the graph comprising: a plurality of graph nodes, each graph node representing a callable function within the codebase, a first graph node from among said plurality including a function signature uniquely identifying the callable function within the codebase; a first graph node absolute path identifying an absolute location of a data file that includes the callable function within a file system; information identifying a child node of the first graph node, said information identifying a child node including a representation of a child function signature identifying a child function associated with the child node and a child node kind associated with the child node, where the child function signature associated with the child node represents a graph edge connecting the first graph node and the child node; and where the child node kind includes one of a direct call kind and an instance call kind, the instance call kind indicating that the child node represents an implementation of an override of a base class method invoked in the callable function.

In some embodiments, information identifying a child node further includes a flag indicating whether or not the child function associated with the child node is a remote procedure call function.

In some embodiments, the function signature is included in the first graph node in a hashed form, the hashed form occupying less data storage space in the medium.

In some embodiments, the child node includes the child function signature uniquely identifying the child function within the codebase; a child node absolute path identifying an absolute location of a data file that includes the child function within a file system; information identifying a connecting node of the graph node, said information identifying a connecting node including a representation of a call-from function signature identifying a call-from function that invokes the child function represented by the child node, where the call-from function signature associated with the connecting node represents a graph edge connecting the child node and the connecting node.

In some embodiments, the first graph node is a connecting node of the child node.

Embodiments of solutions, techniques, and systems described herein may include a system comprising: a processor and a processor-readable memory having embodied thereon instructions configured to cause the processor to some or all of the steps or operations described above and/or to create representations of one or more of the data structures described above.

Embodiments of solutions, techniques, and systems described herein may include a transitory or non-transitory computer-readable medium having embodied thereon instructions that cause a computer to perform some or all of the steps described above and/or to create representations of one or more of the data structures described above.

Further scope of applicability of the systems and methods discussed will become apparent from the detailed description given hereinafter. However, it should be understood that the detailed description and specific examples, while indicating embodiments of the systems and methods, are given by way of illustration only, since various changes and modifications within the spirit and scope of the concepts disclosed herein will become apparent to those skilled in the art from this detailed description.

BRIEF DESCRIPTION OF THE DRAWINGS

The systems and methods discussed will become more fully understood from the detailed description given herein below and the accompanying drawings that are given by way of illustration only and thus are not limitative.

FIG. 2 shows a block diagram representing an embodiment of a graph node as described herein;

The drawings will be described in detail in the course of the detailed description.

DETAILED DESCRIPTION

The following detailed description refers to the accompanying drawings. The same reference numbers in different drawings identify the same or similar elements. Also, the following detailed description does not limit the concepts discussed. Instead, the scope of the concepts discussed herein is defined by the appended claims and equivalents thereof.

A complex large-scale software product or software development environment may require that programmers doing development and/or code maintenance read unfamiliar code. In such situations, it may be challenging and time-consuming to trace the control flow from one function to another. A call path finder capable of finding one or more likely paths between any two functions in a codebase may simplify the process of understanding code and allow for faster and easier software development and maintenance.

An embodiment of a call path finder for a particular code base may be realized by creating and then querying a graph or tree data structure. In some embodiments, such a graph may include each function of the code base as a graph node, with connecting nodes representing all other possible functions and/or function instances that are or could be called from that function. Furthermore, connecting nodes may also represent call-from functions, which are functions and/or function instances that do or can invoke the function represented by a particular node.

In a monolithic code base, for example, such a graph could be built as a sorted key map in one or more database tables. Each graph node may include a unique signature, such as a function signature, that identifies the particular function represented by the node. To account for updates and changes to the codebase, such a graph could be rebuilt and/or updated at regular intervals (e.g. nightly).

In embodiments involving object-oriented technologies, a static analysis of incoming and outgoing function calls may not capture subtleties or variations caused by things such as function overloading or override. In some embodiments, a function may make an interface call to a method or function of a base class. In some cases, this may be a call to an instance of the base class. In other cases, this may be a call to an overloaded instance of the base class method. In some embodiments meant to account for overloaded functions, the number of connections to a given node may be expanded to include each implementation of an override of the base class method as a child or connecting node.

Figure 1A:
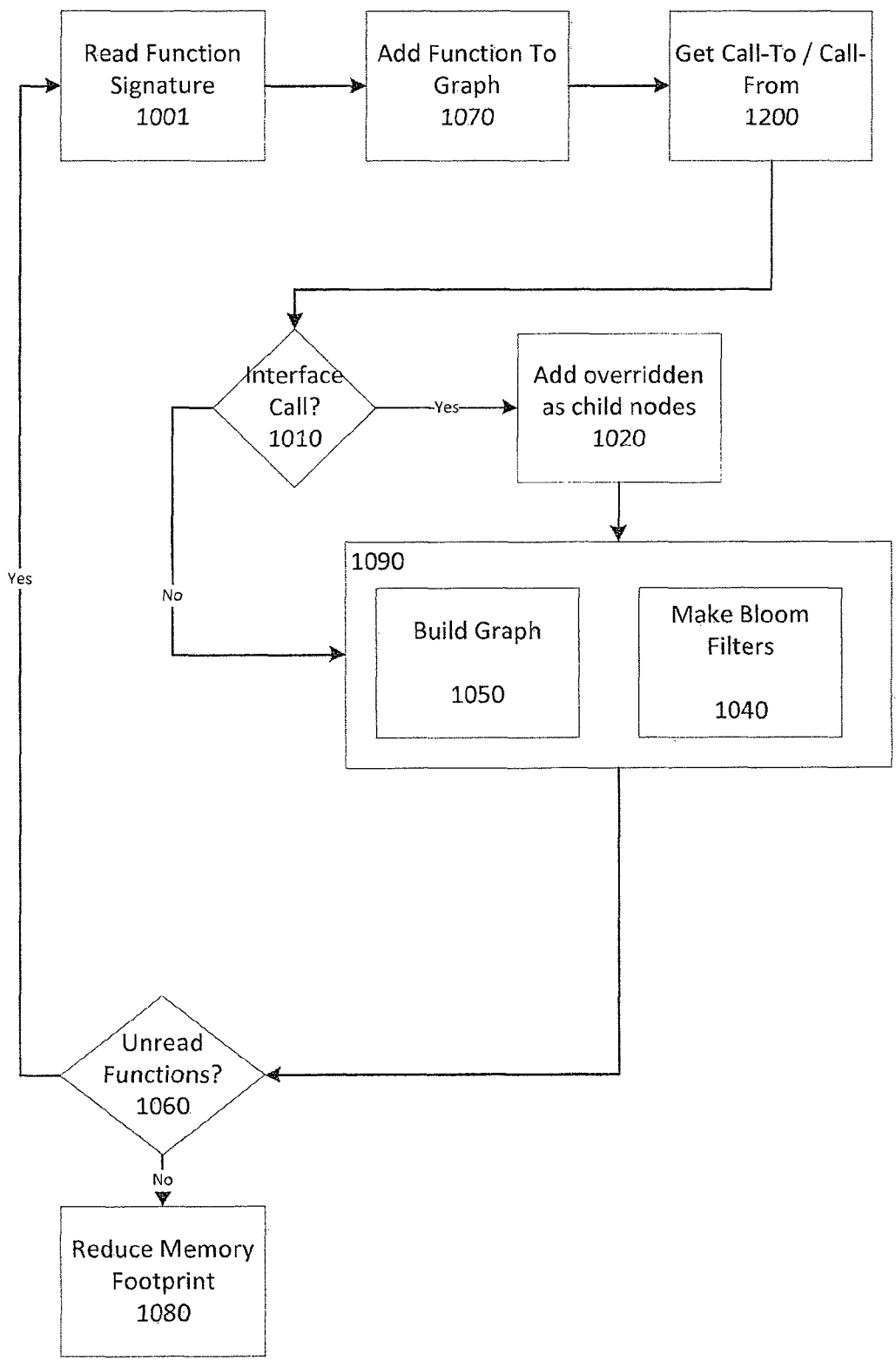
FIG. 1a shows a block diagram representing an embodiment of a function call graph generation operation as described herein.

An embodiment of a graph construction process for a monolithic codebase is shown in FIG. 1a. In the embodiment shown, each function in the codebase may have a function signature. This may be a number, string, or other piece of information that uniquely identifies the function within the codebase. In some embodiments, such a function signature may be generated for the function as part of the graph construction process. In some embodiments, source management policies or practices for the codebase or development environment may require that each function and/or each class be associated with a unique identifier that may be used as part or all of a function signature.

An example of a function signature may include a class signature in an object-oriented programming language such as, for example, Java. Another example of a function signature may include a name created from a directory path of a source code file for a particular class, the name of the class, and the name of the function within the class. Other embodiments may utilize other techniques to create unique identifiers to use as function signatures.

The function signature may be generated or read 1001 and the function identified by the signature may be added to the graph 1070 as a node. In some embodiments, adding the function to the graph 1070 as a node may include parsing or otherwise traversing the function to identify call-to and call-from functions 1200.

Call-to functions are those functions that are or can be called from within the added function. Such call-to functions may have their function signatures included as children or connecting nodes of the node representing the added function. In some embodiments, call-from functions, which are those functions which call or may call the added function, may also be identified based on the function signature.

In some embodiments, all the function signatures of a codebase may be stored in one or more database tables. In some embodiments, the signatures may be stored in a sorted string table for ease of data lookup. In some embodiments, the function signatures may indicate or serve as a key to access the call-to, call-from, and any related inheritance information for a particular function. In such embodiments, scanning such database tables may provide the call-to and call-from data for a particular function.

In other embodiments, call-from information may be generated recursively during graph construction. In such embodiments, identifying a call-from function in a particular node may enable that particular node to be identified as a call-to node for the node representing the call-from function. In some such embodiments, a master call-to or call-from table or data structure may be dynamically created in one or more database tables as part of the graph generation process. In some embodiments, all the graph nodes may include call-to values to facilitate breadth-first searching. In some embodiments, all the graph nodes may include call-from values to facilitate breadth-first searching.

In some object-oriented embodiments, an added function may include an interface call 1010 to a base class method. Such an interface call 1010 to a method or function of a base class may, in some cases, be a call to an instance of the base class. In other cases, such an interface call 1010 may be a call to an overloaded instance of the base class method. Because it cannot be readily determined, in a static analysis setting, whether the interface call 1010 is to an overloaded instance or not, some embodiments of a graph construction method may add each implementation of an override of the base class method as a call-to child or connecting node 1020 of the node representing the function.

In some embodiments, such inheritance expansion may cause the number of nodes and connections in the graph to become unmanageably large. In some embodiments, such inheritance expansion may add child or connecting nodes that suggest impossible or otherwise unlikely (e.g. false positive) graph edges.

In some embodiments, the function, along with any potential child nodes 1020 may be added to the call graph 1090. The graph may be built 1050 in this way for the various call paths, with each graph node being associated with a filter such as a Bloom filter. The Bloom filter for a given call from/call to function pair may be created 1040 based on the binary files common to the functions.

In some embodiments, Bloom filters may be created based on each binary file that is compiled or indicated for compilation within the codebase. In some embodiments, such Bloom filters may be created based on a utility such as a version control tool that identifies which source code files and which source code file versions are to be compiled into a particular version of an application or program. The length or data size of a particular Bloom filter may, in some embodiments, vary based on a number of source code files and/or functions included in a particular binary file representing a compiled application or program.

In some embodiments, the graph construction process may read each function within the codebase. In some such embodiments, once the graph construction process indicates that all the functions have been read 1060 and added to the graph 1090, it may then proceed to reduce a memory footprint of the created graph 1080. Embodiments of memory footprint reduction may include employing hashed function signatures and variable-length Bloom filters as discussed above.

In some embodiments, the constructed call graph may be stored in volatile memory or fast-access memory such as Flash memory to allow for faster access to and traversal of the graph. In some such embodiments, the length or data size of a Bloom Filter may be varied depending on a desired tolerance for false positive outcomes. In some embodiments, varying a size of a Bloom filter to allow for 0.01% false positive outcomes may allow for a good balance between data quality and data size. In embodiments employing function-based Bloom filters, functions whose files exist in more binary files may get larger size Bloom filters.

Figure 1B:
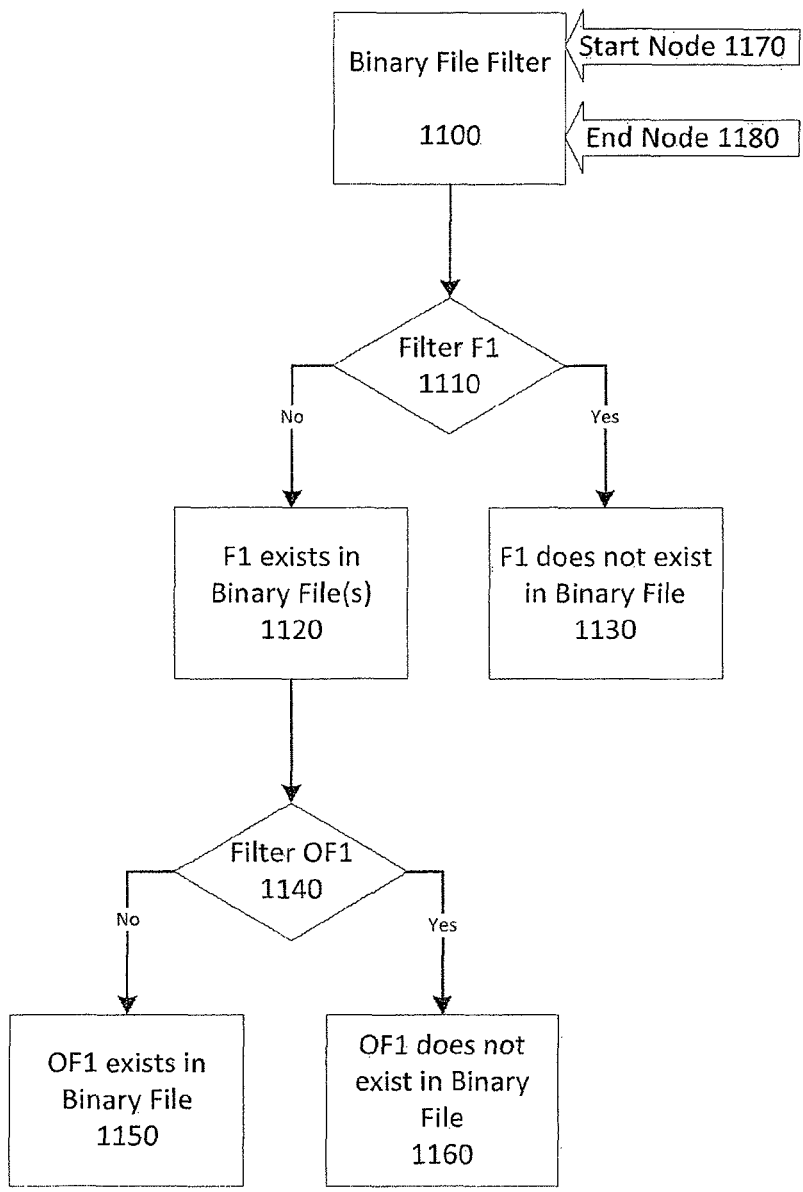
FIG. 1b shows a block diagram representing an embodiment of a shared binary identification operation as described herein.

An example of an embodiment of a common binary file identification process to find a call path is depicted in FIG. 1b Starting with a binary file filter 1100 such as a Bloom filter, and a starting node 1170 and ending node 1180 in a graph, the function signatures associated with the start and end nodes may be evaluated using the filter 1110. If the functions identified by the function signatures are not indicated as being included in the binary files represented by the filter 1130, the filtering process for that Bloom filter stops and a filtering process for a subsequent set of binary files may be initiated.

If the functions identified by the function signatures are indicated as being included in the binary files represented in the Bloom filter 1120, each implementation of an override of the base class method added as a child or connecting node may be evaluated using that same filter 1140. Each implementation of an override of the base class method that passes the filter is determined to be included in the binary files 1150 and remains as a potential node in a function call path. Each implementation of an override of the base class method that does not pass the filter is determined to not have that binary file in common with the calling (call-from) function 1160 and is therefore not a potential node in a function call path.

In other embodiments, a Bloom filter may be created for each graph node/function signature having child or connecting nodes added to account for inheritance expansion. In such embodiments, the Bloom filter may be created based on a utility such as a version control tool that identifies which source code files and which source code file versions are to be compiled into a particular version of an application or program. The Bloom filter for a particular set of binary files based on functions identified by the function signatures of graph nodes may include information about all the functions in each of the binary files where the identified functions occur. In such an embodiment, a Bloom filter may allow for direct evaluation each implementation of an override of the base class method added as a child or connecting node 1140 because the Bloom filter would already be specific to the binary files that include the functions represented in the start and end nodes.

Figure 1C:
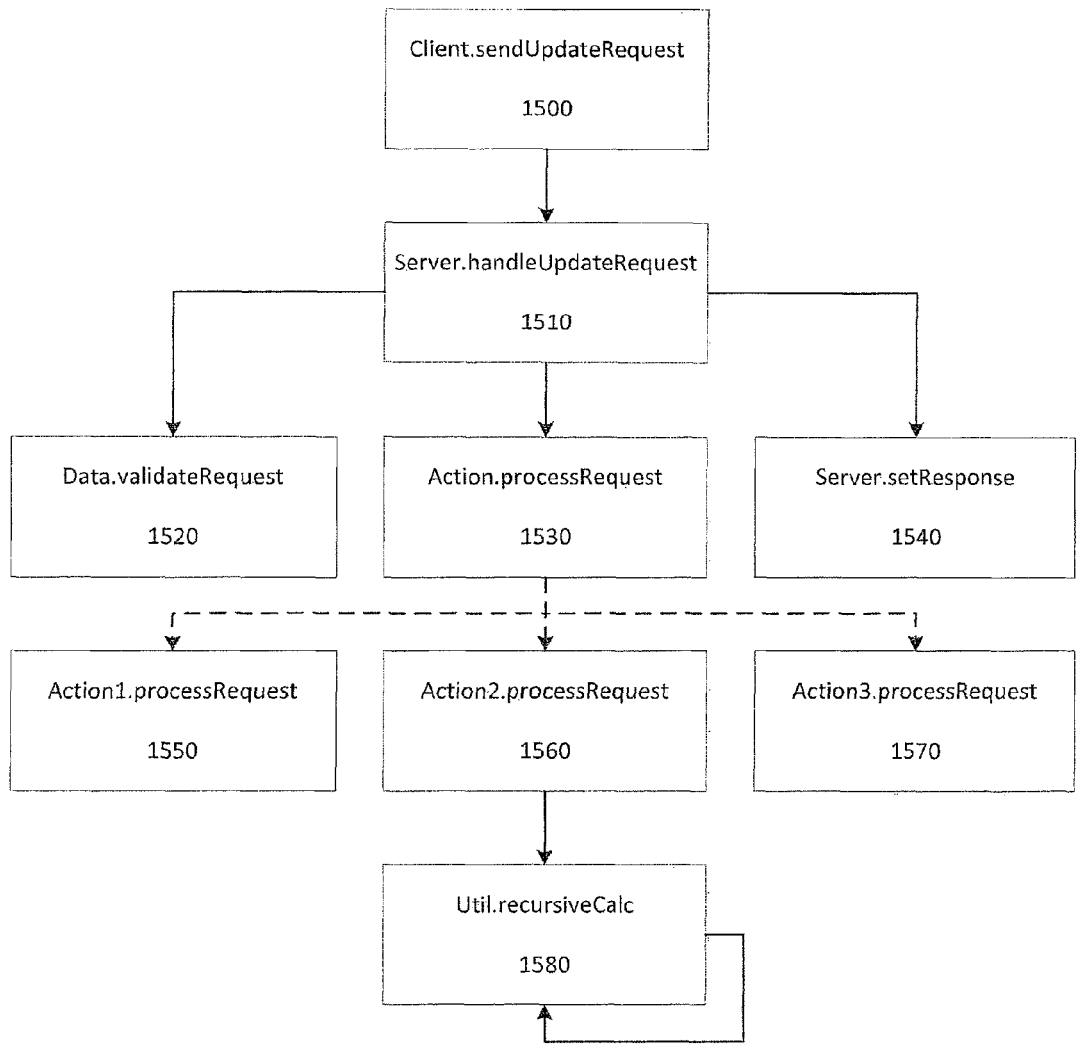
FIG. 1c shows a block diagram representing an embodiment of a portion of a function call graph as described herein.

An embodiment of an exemplary function call graph or graph portion is depicted in FIG. 1c. In the embodiment shown, the function call paths from an update request function 1500 are depicted. An update request function 1500 called in a class Client may call an update request handler function 1510 in a class Server. The update request handler function 1510 may call a request validation function 1520, a request processing function 1530, and a response setting function 1540. The request processing function 1530 from class Action may be overridden by request processing functions 1550 1560 1570 in classes Action1, Action2, and Action3, respectively. These connections are indicated by dashed lines because, in some embodiments, they must be resolved within the graph during run-time analysis instead of through static analysis. The Action2 request processing function 1560 may call a recursive calculation function 1580 which calls back on itself. In the embodiments shown, each of the functions represents a graph node.

An embodiment of a data structure representing a node of a function call graph as discussed herein is shown in FIG. 2. In the embodiment shown, a graph node 2010 may include information indicating a function signature 20200 that identifies the particular function represented by the node. The graph node 2010 may also include information indicating an absolute path of the source file that includes the function identified by the function signature 20190. Such an absolute path 20190 may include information about a particular file location in one or both of a directory in a virtual or logical file system and an absolute physical location of the data in a particular storage location of one or more specific storage or storage-equipped devices.

An embodiment of a graph node 2010 may also include information representing a Bloom filter 20210 based on all the binary files into which the function identified by the graph node is compiled. As discussed above, such a Bloom filter may be variable in length based on a desired or acceptable level of fault tolerance. In some embodiments where false positive (or false negative) outcomes are not tolerated or otherwise acceptable, a different type of filter may be employed.

An embodiment of the graph node 2010 may also include a listing of child or connecting nodes. Although listed as child nodes, such nodes represent connections from the graph node to other nodes and do not otherwise indicate a hierarchy or a conveyance or commonality of features or data between a parent and a child graph node. The exemplary graph node 2010 shown includes a potentially arbitrary number of child nodes 20100, 20130, 20160. Each child node 20100, 20130, 20160 may be identified in the graph node 2010 according to the function signatures of the respective child nodes 20100, 20130, 20160. In embodiments where each function is equipped with or identified by a unique function signature, such function signatures also allow for each graph node to be uniquely identified.

Each child node 20100, 20130, 20160 represented in the graph node 2010 may also include information about a node kind 20110, 20140, 20170. In some embodiments, node kind includes one of a direct call kind and an instance call kind, the instance call kind indicating that the child node represents an implementation of an override of a base class method invoked in the callable function. Direct function calls may be visible or otherwise available for static analysis without having to traverse the graph through the bloom filters. Instance calls may require run-time analysis.

In some embodiments, each child node 20100, 20130, 20160 represented in the graph node 2010 may also include a flag specifying whether or not that child node represents a remote procedure call 20120, 20150, 20180. Such a flag may enable identification of functions that refer to procedures or subroutines that may invoke or trigger functions outside of the codebase. Furthermore, a function that is flagged as a remote procedure call may, in some embodiments, have no call-to functions within the codebase.

Figure 3:
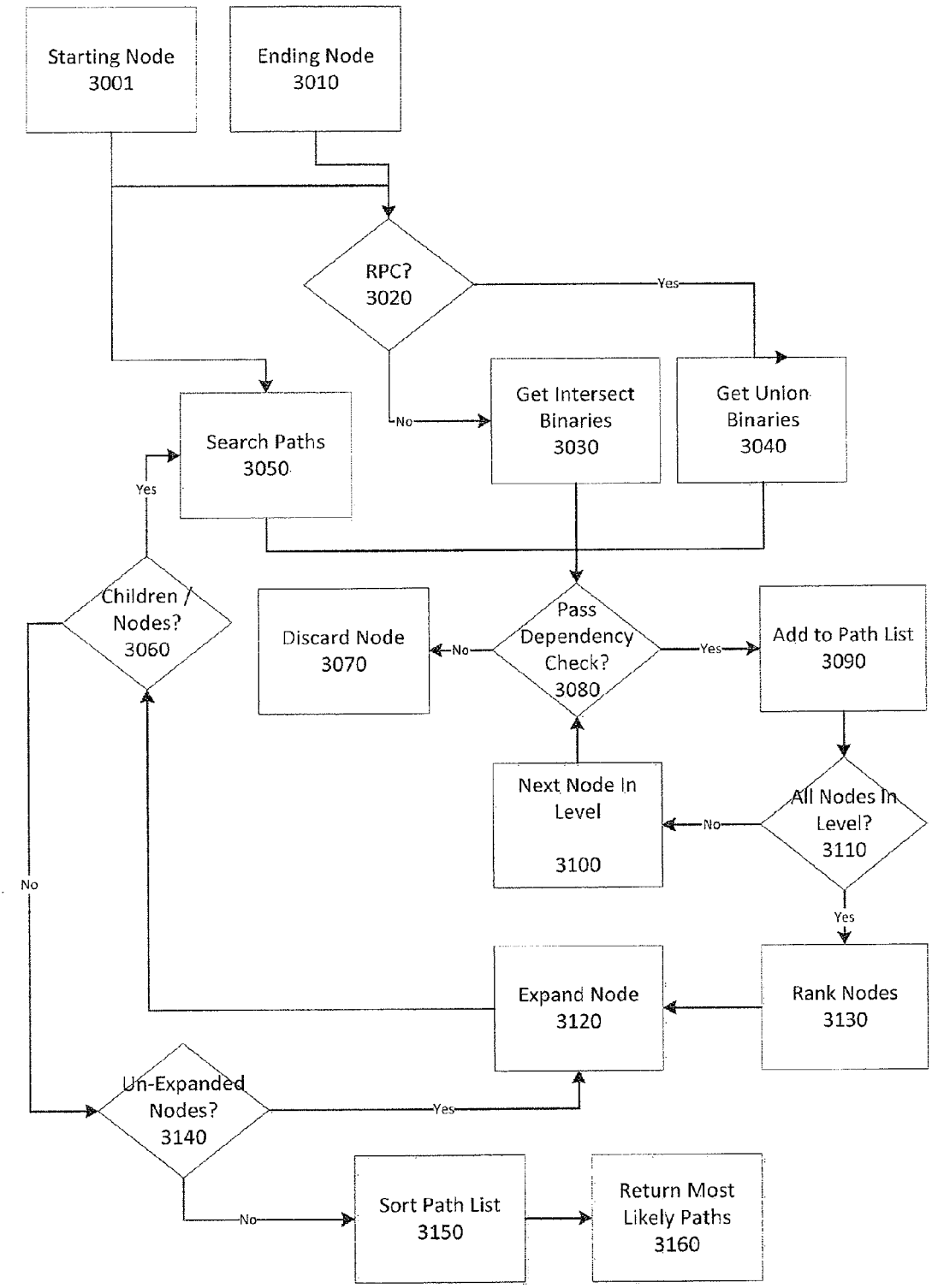
FIG. 3 shows a block diagram representing an embodiment of a graph search and call path generation operation as described herein.

Once an embodiment of a function call graph is generated, the graph can be searched to find one or more possible function call paths between a starting function and an ending function. An embodiment of a call path search operation is depicted in FIG. 3

In the embodiment shown, a call graph search tool may receive, as inputs, a function signature identifying a starting graph node 3001 and a function signature identifying an ending graph node 3010. In some embodiments, the call graph search tool may also construct or access a listing or database showing common dependencies of the starting and ending node. Such dependencies may include, for example, all the binaries that contain a particular class, function, or source file as a dependency. In some such embodiments, in determining a call graph path from a first function to a second function where both functions exist only in a particular executable, all the intermediate graph nodes should also exist only in that particular executable. This may speed up graph search by eliminating from consideration graph nodes related to functions from different executable files.

Beginning at either the starting node 3001 or the ending node 3010 or, in some embodiments, proceeding bi-directionally from both starting 3001 and ending nodes 3010, a breadth-first path search may be initiated of all the child or connecting nodes. In some embodiments, this may be realized by first checking if either the start or end node includes a remote procedure call (RPC) 3020. This check may be performed in some embodiments because even in a monolithic codebase, a remote procedure call may refer to functions in a set of binary files beyond those which include the functions represented by the start and end nodes.

In embodiments where one of the start and end nodes is an RPC 3020, the set of binaries used may include all the binaries that refer to either of the start or end nodes 3040. In embodiments where the neither the start nor the end node is an RPC, the set of binaries used may include only those binaries that refer to both the start and end nodes 3030.

For each node, its Bloom filter may be extracted and the binary files may be tested against the Bloom filter 3080 to determine whether the at least one of the common dependencies passes the Bloom filter for that node 3080.

If the binary files representative of the common dependencies do not pass the Bloom filter for that node, the node is discarded 3070 as not being part of a possible or probable function call path. If the common dependencies pass the Bloom filter for that node, that node is then added to the listing or trace of possible call paths 3090. In embodiments employing breadth-first searching, such evaluation may proceed for all nodes in a given level of the graph 3110 or for all nodes in a given level of the graph that can be analyzed within a given time period or with a particular allocation of computing resources. In such embodiments, after a given node in the graph level is evaluated with its associated Bloom filters, the next node in the level 3100 may then be similarly evaluated until either all the nodes in the level have been evaluated 3110 or, in some cases, until a predetermined amount of time elapses or amount of computing resources is consumed.

The nodes included in the path list may then be ranked 3130 according to a ranking scheme to determine a most likely next node and a least likely next node. In some embodiments, ranking may be determined based on factors such as whether the node is a direct function call or an overloaded/inherited function call. In some such embodiments, direct function calls may be ranked higher than overloaded or inherited function calls. In some embodiments, only a certain number of ranked nodes may be of interest. In some such embodiments, only the five highest-ranked nodes may be kept as ranked nodes, with the remaining nodes discarded or not otherwise further evaluated. In some embodiments, a node matching the ending node 3010 may be the highest ranked node.

After the nodes are ranked 3130, the ranked nodes may each be expanded 3120, starting with the highest-ranked node, to determine whether it has child nodes 3060 to include in a subsequent breadth-first path search 3050. Such expansion may proceed for all ranked nodes 3050 or for all ranked nodes that can be analyzed within a given time period or with a particular allocation of computing resources.

In some embodiments, this search and evaluate operation continues until either the search path terminates at the starting 3001 or ending node 3010 or, in bi-directional embodiments, until the search paths meet and there are no child or connecting nodes remaining to be expanded and searched 3140. Once a list of possible function call paths is created, the list of paths may be sorted 3150 or ranked to identify one or more function call paths deemed to be the most likely or most probable. The graph search tool may then return some or all of the call paths 3160 including the most likely paths.

In some embodiments, the graph search tool may include or be a part of a graphical interface that may depict function call paths as representations of nodes connected along a single or branching path. In some embodiments, graph edges that connect nodes based on inheritance expansion may be identified or otherwise differently displayed to identify them as such.

Figure 4:
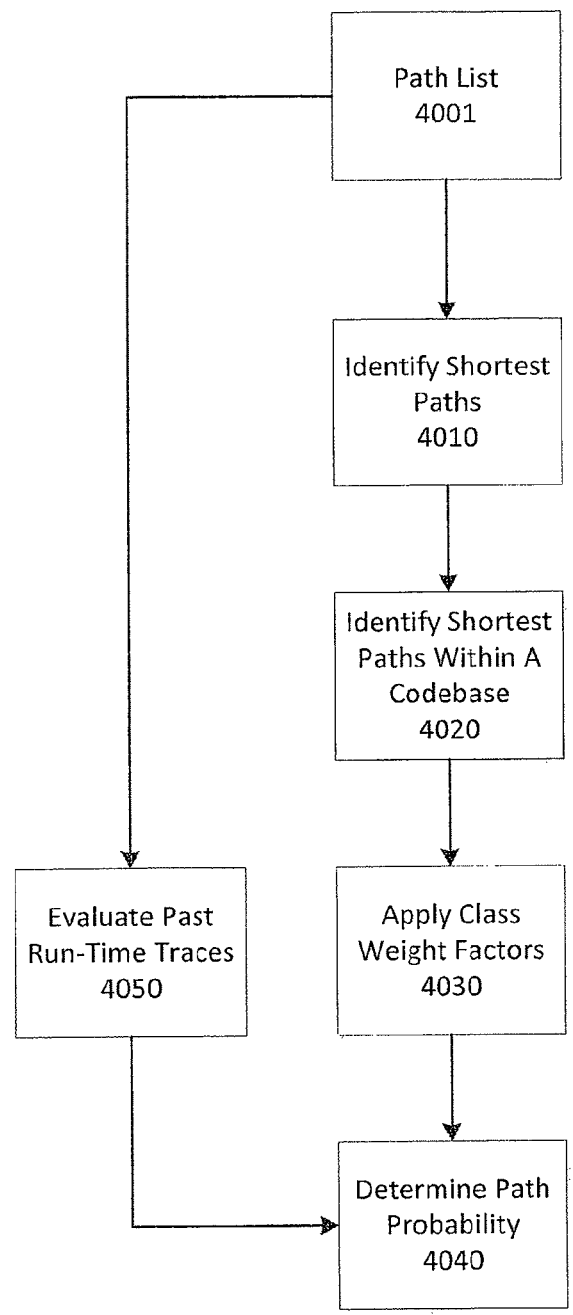
FIG. 4 shows a block diagram representing an embodiment of a call path sorting or raking operation as described herein.

In some embodiments, a path list may be sorted by various criteria, including factors such as an overall path length (e.g. a number of nodes or a number of graph edges in the path), whether or not the path crosses between application or product codebases, whether the path invokes functions from particular objects or object classes, and previous run-time traces showing frequent function call behavior. An embodiment of a path list sorting and probability determination operation is depicted in FIG. 4

Starting with a path list 4001 compiled based on a graph search operation such as the one shown in FIG. 3, a sorting and path probability process may identify the shortest paths 4010 in the list. In some embodiments, a number of shortest paths may be determined by a externally defined or externally controlled setting that governs a number of paths to return and/or a maximum permitted path length. A path length may be determined by a number of nodes in the path, a number of graph edges included in the path, or a combination thereof. In some paths, for example, a node may be passed-through multiple times making a number of graph edges in the path larger than a number of nodes in the path.

In some embodiments, paths may be identified based on whether they are entirely within a codebase for a particular product or application 4020. In some embodiments, preference may be given to paths based on path length and also based on whether they remain within a single product codebase 4020. In some such embodiments, a path entirely within a product or application codebase may be sorted as more likely or more probable than a path of equal or similar length that is not entirely within a single product or application codebase.

In some embodiments, object class weighting factors may also be applied to paths. Such object class weight factors may be determined based, in some embodiments, on frequency of use associated with particular objects or object classes. In such embodiments, function call paths that include a node representing a function from a particular object or object class associated with a weight factor may be given a higher likelihood or probability than function call paths of equal or similar length that do not.

In some embodiments, a likelihood or probability of a particular function call path may be associated with a specific probability percentage calculated based on path length, codebase, and class weight factors. In other embodiments, a likelihood or probability of a particular function call path may be expressed in relative terms compared to other call paths without providing a specific percentage. In some embodiments, a likelihood or probability of a particular function call path may be indicated by a ranking order of a particular call path in the call path list. In some embodiments, determining a call path probability 4040 may include re-ordering or re-ranking the function call paths based on path length 4010, path length within a codebase 4020 and/or class weight factors 4030.

In some embodiments, such re-ordering or re-ranking of function call paths in a path list to determine path probability 4040 may also include evaluating the function call paths against past run-time traces 4050. Such run-time traces may include historical function call data showing frequent and/or likely call paths based on historical application behavior. Once an absolute or relative call path probability is determined by, for example, ranking or ordering the call paths from most to least likely 4040, some amount of the most likely call paths (e.g. the top-ranked paths) may be returned or otherwise selected for presentation to a user of the path search tool or other information requesting entity (such as, for example, an application development or prototyping program or program suite).

Although discussed above in terms of functionality, the features and properties of function graph generation and call path search may be realized through the use of one or more specialized, programmable, and/or specially programmed computing devices or portions thereof.

Figure 5:
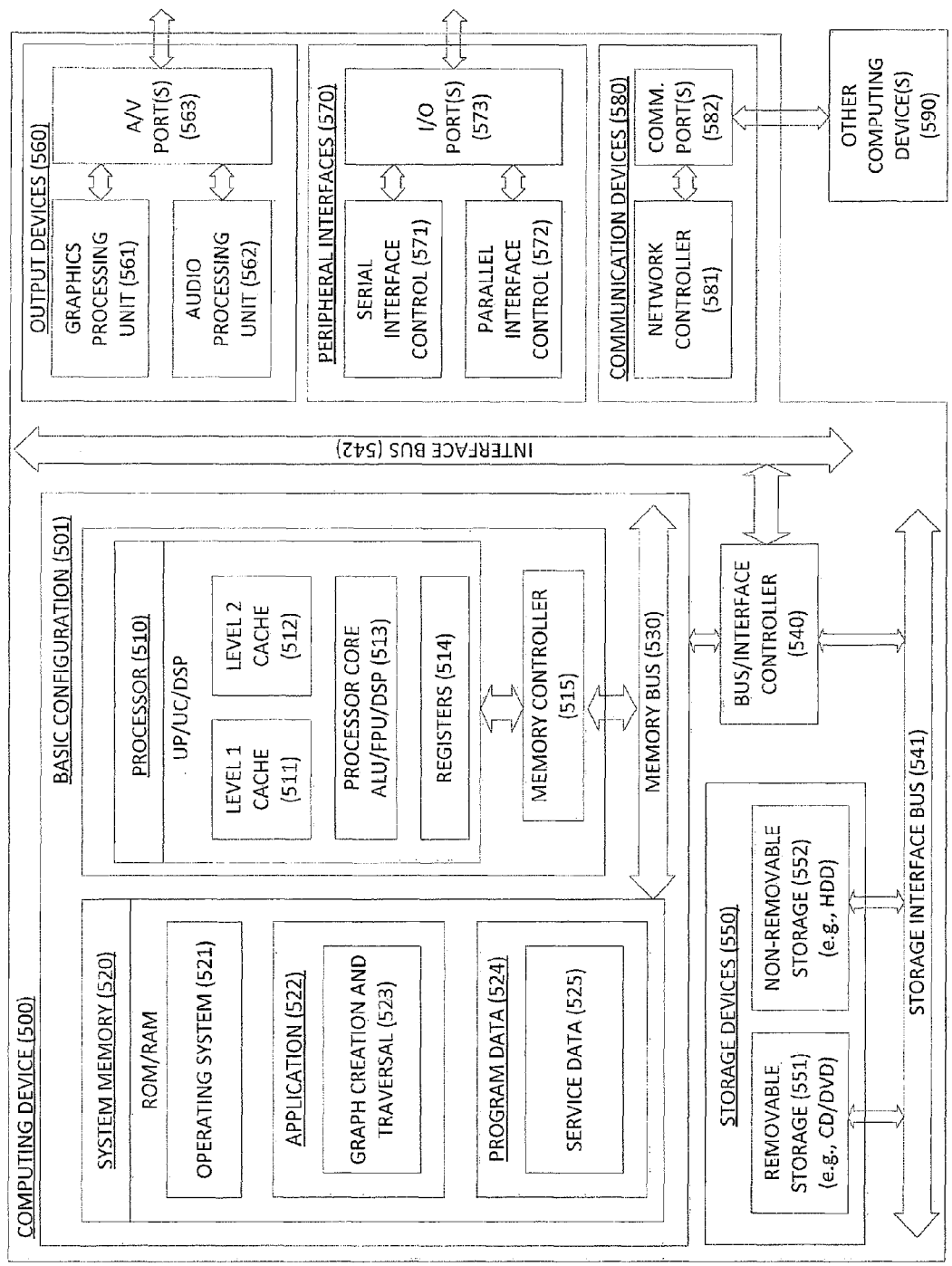
FIG. 5 shows a block diagram representing an embodiment of a computing device arranged to carry out some or all of the graph generation and call path identification operations described herein.

FIG. 5 is a block diagram illustrating an example computing device 500 that is arranged to perform call graph generation and call path search techniques as described herein. In a very basic configuration 501, computing device 500 typically includes one or more processors 510 and system memory 520. A memory bus 530 can be used for communicating between the processor 510 and the system memory 520.

Depending on the desired configuration, processor 510 can be of any type including but not limited to a microprocessor (µP), a microcontroller (µC), a digital signal processor (DSP), or any combination thereof. Processor 510 can include one more levels of caching, such as a level one cache 511 and a level two cache 512, a processor core 513, and registers 514. The processor core 513 can include an arithmetic logic unit (ALU), a floating point unit (FPU), a digital signal processing core (DSP Core), or any combination thereof. A memory controller 515 can also be used with the processor 510, or in some implementations the memory controller 515 can be an internal part of the processor 510.

Depending on the desired configuration, the system memory 520 can be of any type including but not limited to volatile memory (such as RAM), non-volatile memory (such as ROM, flash memory, etc.) or any combination thereof. System memory 520 typically includes an operating system 521, one or more applications 522, and program data 524. Application 522 may include a call graph generation and/or call path search feature as discussed herein. Program Data 524 includes location data such as one or more dependency lists or object name lists 525 that are useful for performing the desired operations as described above. In some embodiments, application 522 can be arranged to operate with program data 524 on an operating system 521 such that the overall system performs one or more specific variations of techniques as discussed herein. This described basic configuration is illustrated in FIG. 5 by those components within line 501.

Computing device 500 can have additional features or functionality, and additional interfaces to facilitate communications between the basic configuration 501 and any required devices and interfaces. For example, a bus/interface controller 540 can be used to facilitate communications between the basic configuration 501 and one or more data storage devices 550 via a storage interface bus 541. The data storage devices 550 can be removable storage devices 551, non-removable storage devices 552, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 520, removable storage 551 and non-removable storage 552 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media can be part of device 500.

Computing device 500 can also include an interface bus 542 for facilitating communication from various interface devices (e.g., output interfaces, peripheral interfaces, and communication interfaces) to the basic configuration 501 via the bus/interface controller 540. Example output devices 560 include a graphics processing unit 561 and an audio processing unit 562, which can be configured to communicate to various external devices such as a display or speakers via one or more A/V ports 563. Example peripheral interfaces 570 include a serial interface controller 571 or a parallel interface controller 572, which can be configured to communicate with external devices such as input devices (e.g., keyboard, mouse, pen, voice input device, camera, touch input device, etc.) or other peripheral devices (e.g., printer, scanner, etc.) via one or more I/O ports 573. An example communication device 580 includes a network controller 581, which can be arranged to facilitate communications with one or more other computing devices 590 over a network communication via one or more communication ports 582.

The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 500 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 can also be implemented as a personal computer including both laptop computer and non-laptop computer configurations.

In some cases, little distinction remains between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Only exemplary embodiments of the systems and solutions discussed herein are shown and described in the present disclosure. It is to be understood that the systems and solutions discussed herein are capable of use in various other combinations and environments and are capable of changes or modifications within the scope of the concepts as expressed herein. Some variations may be embodied in combinations of hardware, firmware, and/or software. Some variations may be embodied at least in part on computer-readable storage media such as memory chips, hard drives, flash memory, optical storage media, or as fully or partially compiled programs suitable for transmission to/download by/installation on various hardware devices and/or combinations/collections of hardware devices. Such variations are not to be regarded as departure from the spirit and scope of the systems and solutions discussed herein, and all such modifications as would be obvious to one skilled in the art are intended to be included within the scope of the following claims.

The invention claimed is:

1. A method of determining a likely call path between two functions in a code base, the method comprising:
   receiving, as inputs, a source function and a destination function;
   identifying, in a function call graph, a starting node associated with the source function and an ending node associated with the destination function;
   searching possible paths in the function call graph between the starting node and the ending node, said searching including, for each node at a level of the graph:
      evaluating the node against a list of common dependencies shared by the starting node and the ending node;
      for an evaluated node having a dependency included in the list of common dependencies, including the evaluated node in a possible path list;
      for an evaluated node not having a dependency included in the list of common dependencies, excluding the evaluated node from any possible path list;
   ranking the nodes included in the possible path list;
   for each ranked node, expanding the ranked node to determine if the ranked node includes child nodes;
   responsive to a determination that the ranked node has child nodes, treating the ranked node as a starting node and performing said searching possible paths for each child node of the ranked node; and
   responsive to a determination that the ranked node has no child nodes, identifying a function call path including the ranked node as a possible function call path;
   sorting the possible function call paths between the starting node and the ending node; and
   returning, as a likely call path, at least one of the sorted possible function call paths.

2. The method of claim 1, the said sorting all possible function call paths including:
   ordering said all possible function call paths from shortest to longest;
   identifying, from among the ordered function call paths, those function call paths entirely within a single codebase;
   applying weight factors to the ordered function call paths such that said all possible function call paths are ordered from most likely to least likely based on function call path length and weight factor, the weight factor including indicating as more likely those function call paths entirely within a single codebase; and
   returning, as a likely call path, at least the most likely function call path after said applying weight factors.

3. The method of claim 2, said applying weight factors including generating weight factors based on historical trace data generated from previous function executions such that function call paths indicated by the historical trace data are associated with weight factors indicating those function call paths as more likely.

4. The method of claim 2, said applying weight factors including applying class-based weight factors such that call paths including commonly used object classes will be indicated as more likely.

5. The method of claim 1, said searching possible paths including performing a bi-directional search originating from both the starting and ending nodes.

6. The method of claim 1, said evaluating the node against a list of common dependencies including applying a Bloom filter associated with the node to at least one binary file compiled from a source code file that includes at least one of the source function and the destination function;
the node being evaluated as having a dependency included in the list of common dependencies in response to said at least one binary file passing the applied Bloom filter.

7. The method of claim 6, the method further comprising:
in response to a determination that at least one of the source function and the destination function are remote procedure calls, said Bloom filter being configured to pass those binary files that include at least one of the source function and the destination function;
in response to a determination that at least one of the source function and the destination function are not remote procedure calls, said Bloom filter being configured to pass those binary files that include both of the source function and the destination function.

8. The method of claim 6, where a size of the Bloom filter is based on a number of binary files the Bloom filter is configured to pass.

9. A non-transitory computer-readable medium having embodied thereon instructions for causing one or more processors to execute a method of determining a likely call path between two functions in a code base, the method comprising:
receiving, as inputs, a source function and a destination function;
identifying, in a function call graph, a starting node associated with the source function and an ending node associated with the destination function;
searching possible paths in the function call graph between the starting node and the ending node, said searching including, for each node at a level of the graph:
evaluating the node against a list of common dependencies shared by the starting node and the ending node;
for an evaluated node having a dependency included in the list of common dependencies, including the evaluated node in a possible path list;
for an evaluated node not having a dependency included in the list of common dependencies, excluding the evaluated node from any possible path list;
ranking the nodes included in the possible path list;
for each ranked node, expanding the ranked node to determine if the ranked node includes child nodes;
responsive to a determination that the ranked node has child nodes, treating the ranked node as a starting node and performing said searching possible paths for each child node of the ranked node; and
responsive to a determination that the ranked node has no child nodes, identifying a function call path including the ranked node as a possible function call path;
sorting the possible function call paths between the starting node and the ending node; and
returning, as a likely call path, at least one of the sorted possible function call paths.

10. The non-transitory computer-readable medium of claim 9, the said sorting all possible function call paths including:
ordering said all possible function call paths from shortest to longest;
identifying, from among the ordered function call paths, those function call paths entirely within a single codebase;
applying weight factors to the ordered function call paths such that said all possible function call paths are ordered from most likely to least likely based on function call path length and weight factor, the weight factor including indicating as more likely those function call paths entirely within a single codebase; and
returning, as a likely call path, at least the most likely function call path after said applying weight factors.

11. The method of claim 9, said applying weight factors including generating weight factors based on historical trace data generated from previous function executions such that function call paths indicated by the historical trace data are associated with weight factors indicating those function call paths as more likely.

12. The non-transitory computer-readable medium of claim 9, said applying weight factors including applying class-based weight factors such that call paths including commonly used object classes will be indicated as more likely.

13. The non-transitory computer-readable medium of claim 9, said searching possible paths including performing a bi-directional search originating from both the starting and ending nodes.

14. The non-transitory computer-readable medium of claim 9, said evaluating the node against a list of common dependencies including applying a Bloom filter associated with the node to at least one binary file compiled from a source code file that includes at least one of the source function and the destination function;
the node being evaluated as having a dependency included in the list of common dependencies in response to said at least one binary file passing the applied Bloom filter.

15. The non-transitory computer-readable medium of claim 14, the method further comprising:
in response to a determination that at least one of the source function and the destination function are remote procedure calls, said Bloom filter being configured to pass those binary files that include at least one of the source function and the destination function;
in response to a determination that at least one of the source function and the destination function are not remote procedure calls, said Bloom filter being configured to pass those binary files that include both of the source function and the destination function.

16. The non-transitory computer-readable medium of claim 14, where a size of the Bloom filter is based on a number of binary files the Bloom filter is configured to pass.

17. A system comprising:

a processor;

a processor-readable memory having embodied thereon instructions for causing the processor to perform a method of determining a likely call path between two functions in a code base, the method comprising:

receiving, as inputs, a source function and a destination function;

identifying, in a function call graph, a starting node associated with the source function and an ending node associated with the destination function;

searching possible paths in the function call graph between the starting node and the ending node, said searching including, for each node at a level of the graph:

evaluating the node against a list of common dependencies shared by the starting node and the ending node;

for an evaluated node having a dependency included in the list of common dependencies, including the evaluated node in a possible path list;

for an evaluated node not having a dependency included in the list of common dependencies, excluding the evaluated node from any possible path list;

ranking the nodes included in the possible path list;

for each ranked node, expanding the ranked node to determine if the ranked node includes child nodes;

responsive to a determination that the ranked node has child nodes, treating the ranked node as a starting node and performing said searching possible paths for each child node of the ranked node; and responsive to a determination that the ranked node has no child nodes, identifying a function call path including the ranked node as a possible function call path;

sorting the possible function call paths between the starting node and the ending node; and returning, as a likely call path, at least one of the sorted possible function call paths.

18. The system of claim 17, the said sorting all possible function call paths including:

ordering said all possible function call paths from shortest to longest;

identifying, from among the ordered function call paths, those function call paths entirely within a single codebase;

applying weight factors to the ordered function call paths such that said all possible function call paths are ordered from most likely to least likely based on function call path length and weight factor, the weight factor including indicating as more likely those function call paths entirely within a single codebase; and returning, as a likely call path, at least the most likely function call path after said applying weight factors.

19. The system of claim 18, said applying weight factors including generating weight factors based on historical trace data generated from previous function executions such that function call paths indicated by the historical trace data are associated with weight factors indicating those function call paths as more likely.

* * * * *